United States Patent
Abou Mahmoud et al.

(10) Patent No.: US 10,158,732 B2
(45) Date of Patent: Dec. 18, 2018

(54) DELEGATED UPDATES

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 14/809,301

(22) Filed: Jul. 27, 2015

(65) Prior Publication Data
US 2017/0034290 A1 Feb. 2, 2017

(51) Int. Cl.
*H04L 29/08* (2006.01)
*H04L 12/26* (2006.01)

(52) U.S. Cl.
CPC ............ *H04L 67/22* (2013.01); *H04L 43/16* (2013.01)

(58) Field of Classification Search
CPC ......... H04L 67/22; H04L 43/16; H04L 51/12; H04L 51/32; G06F 17/30864
See application file for complete search history.

(56) References Cited

U.S. PATENT DOCUMENTS

| | | | | |
|---|---|---|---|---|
| 5,907,597 A | * | 5/1999 | Mark | G06Q 20/341 340/5.84 |
| 5,941,947 A | * | 8/1999 | Brown | G06F 21/6218 709/225 |
| 7,395,097 B2 | | 7/2008 | Perdomo et al. | |
| 8,375,092 B2 | | 2/2013 | Digate et al. | |
| 8,484,703 B2 | * | 7/2013 | Kenny | G06F 21/33 709/224 |
| 8,539,046 B2 | * | 9/2013 | Gillett | G06Q 10/107 709/218 |
| 8,745,249 B2 | * | 6/2014 | Lee | G06F 9/5072 705/7.11 |
| 8,756,163 B2 | * | 6/2014 | Schleier-Smith | G06Q 30/02 705/319 |

(Continued)

FOREIGN PATENT DOCUMENTS

| | | | |
|---|---|---|---|
| CA | 2907182 A1 | * | 9/2014 |
| KR | 20140109000 A | * | 9/2014 |

(Continued)

OTHER PUBLICATIONS

Deathswitch.com, "Let Them Know What to Expect", Copyright 2014, http://www.deathswitch.com/, pp. 1-5.

*Primary Examiner* — Kostas J Katsikis
(74) *Attorney, Agent, or Firm* — Michael A. Petrocelli

(57) ABSTRACT

A computer implemented method and system for delegating authority on an online account includes monitoring a user of a plurality of users using an online social network on a communications system. A designated user for an originating user from the plurality of users is assigned, responsive to the originating user of the plurality of user's selection of the designated user. The designated user is activated, responsive to determining an absence of access of the originating user on the online social network. A delegation action is presented to the designated user, and the delegation action is performed on behalf of the originating user, responsive to the designated user's selection of the delegation action.

14 Claims, 3 Drawing Sheets

(56) References Cited

U.S. PATENT DOCUMENTS

| | | | |
|---|---|---|---|
| 8,806,584 B2* | 8/2014 | Lunt | H04L 51/12 726/4 |
| 9,003,486 B2* | 4/2015 | Asokan | H04L 63/0407 726/2 |
| 9,038,146 B1* | 5/2015 | Desikan | G06F 21/45 709/204 |
| 9,094,360 B1* | 7/2015 | Bapat | H04L 63/102 |
| 9,178,883 B2* | 11/2015 | Perrone, II | H04L 63/0892 |
| 9,275,149 B2* | 3/2016 | Magill | G06F 17/30876 |
| 9,369,451 B2* | 6/2016 | Le | H04L 63/08 |
| 9,460,299 B2* | 10/2016 | Weiss | G06F 21/604 |
| 2011/0231199 A1* | 9/2011 | Cunningham | G06Q 30/08 705/1.1 |
| 2012/0317624 A1 | 12/2012 | Monjas Llorente et al. | |
| 2012/0330789 A1* | 12/2012 | Heck | G06Q 10/06 705/26.41 |
| 2013/0073636 A1* | 3/2013 | Zhu | H04L 51/043 709/206 |
| 2013/0092730 A1* | 4/2013 | Blinbaum | G06K 19/06009 235/375 |
| 2013/0332250 A1* | 12/2013 | Armaly | H04N 21/252 705/14.23 |
| 2014/0026229 A1 | 1/2014 | Bertin | |
| 2014/0041055 A1* | 2/2014 | Shaffer | G06Q 10/10 726/28 |
| 2014/0059029 A1* | 2/2014 | Magill | G06F 17/30864 707/706 |
| 2014/0195445 A1 | 7/2014 | Abuelsaad et al. | |
| 2014/0280962 A1 | 9/2014 | Schultz | |
| 2014/0359042 A1* | 12/2014 | Fenley | H04L 12/6418 709/208 |
| 2015/0163311 A1* | 6/2015 | Heath | G06Q 30/0201 709/204 |
| 2015/0195313 A1* | 7/2015 | Lewis | G06Q 50/01 709/204 |
| 2015/0264091 A1* | 9/2015 | Lin | H04L 67/12 709/228 |
| 2016/0259538 A1* | 9/2016 | Stephens | H04L 67/306 |
| 2016/0328952 A1* | 11/2016 | Will | G08B 25/016 |
| 2017/0076518 A1* | 3/2017 | Patterson | G07C 9/00031 |
| 2017/0083721 A1* | 3/2017 | Suchter | G06F 21/10 |
| 2017/0169699 A1* | 6/2017 | Will | H04W 4/90 |

FOREIGN PATENT DOCUMENTS

| | | |
|---|---|---|
| WO | 2011161674 A1 | 12/2011 |
| WO | WO-2012077997 A2 * | 6/2012 |
| WO | WO-2013181350 A3 * | 3/2014 |
| WO | WO-2016183111 A1 * | 11/2016 |

* cited by examiner

DELEGATED UPDATES

BACKGROUND

The present disclosure relates to a method and system for delegating authority on an online account. Online social networks can be used to connect with other users, enable sharing between users, and process information between users. Online social networks can include social networks on a local network, a wide area network, utilizing the Internet, or a mail client including web-based email.

Common techniques of sharing and processing information can include an inbox, a post, or a profile on a social network. These techniques enable users to share information with others, or gather information from others. However, when a user is unable to access the social network there is a lack of alternative methods to post content, and to ascertain a user's absence, as well as to notify others of the user's absence.

Many conditions can be responsible for a user to be offline or unable to access the social network. For example, an identity provider of a social network may be unavailable for users who wish to login; a user can be locked out of a system or social network; a user's machine may be down (for example, nonfunctioning, broken, unavailable; lost or stolen), or a user's network access can be unavailable. In the above exemplary situations a user's online presence can be unavailable or offline. Issues that can occur when a user's online presence is unavailable include, for example: a user's input or contribution to the social group or network is not present; the other users' in the social group are not informed of the status of the unavailable user; and an alternative contact for the unavailable user may not be available.

SUMMARY

According to an aspect of the present invention, a computer implemented method delegates authority on an online account. The method monitors a user using a computer, the user is part of an online social network accessed using a communications system, and the online social network includes a plurality of users. A designated user for the user from the plurality of users is assigned, responsive to the user's selection of the designated user. The designated user is activated, responsive to determining an absence of access of the user on the online social network. A delegation action is presented to the designated user. The delegation action is performed on behalf of the user, responsive to the designated user's selection of the delegation action.

In another aspect of the present invention, a computer program product delegates authority on an online account. The computer program product includes a computer readable storage medium having program instructions embodied therewith, wherein the computer readable storage medium is not a transitory signal per se. The program instructions are executable by a computer to cause the computer to perform a method, comprising: monitoring a user using a computer, the user being part of an online social network accessed using a communications system, the online social network including a plurality of users; assigning a designated user for the user from the plurality of users, responsive to the user's selection of the designated user; activating the designated user, responsive to determining an absence of access of the user on the online social network; presenting a delegation action to the designated user; and performing the delegation action on behalf of the user, responsive to the designated user's selection of the delegation action.

In another aspect of the present invention, a computer system delegates authority on an online account. The computer system includes one or more computer processors, one or more computer-readable storage media, and program instructions stored on one or more of the computer-readable storage media for execution by at least one of the one or more processors. The program instructions, comprise: monitoring a user using a computer, the user being part of an online social network accessed using a communications system, the online social network including a plurality of users; assigning a designated user for the user from the plurality of users, responsive to the user's selection of the designated user; activating the designated user, responsive to determining an absence of access of the user on the online social network; presenting a delegation action to the designated user; and performing the delegation action on behalf of the user, responsive to the designated user's selection of the delegation action.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are described hereinbelow.

DETAILED DESCRIPTION

Figure 1:
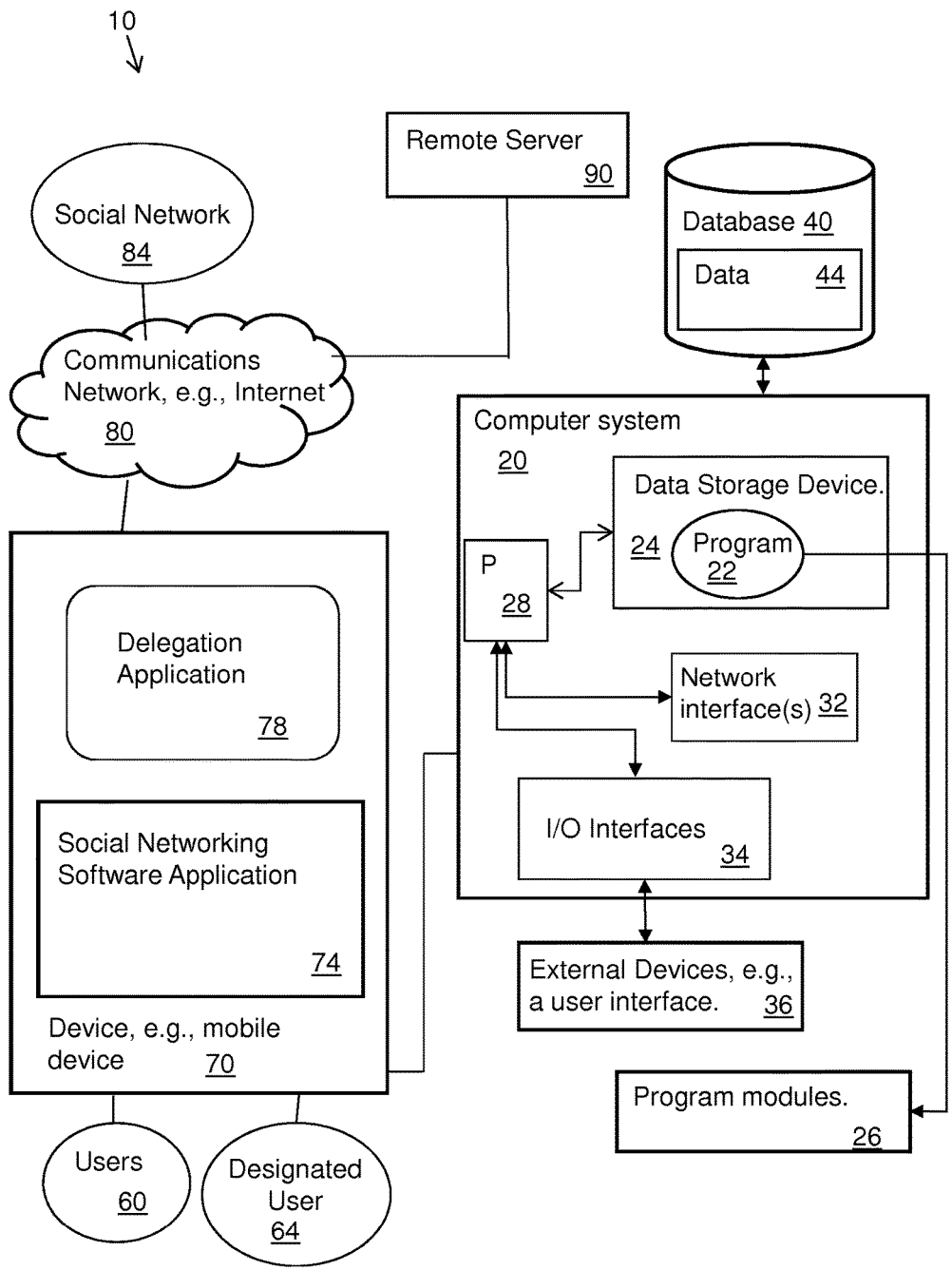
FIG. 1 is a schematic block diagram illustrating an overview of a system and methodology for delegating authority on an online account according to an embodiment of the disclosure.
Figure 2:
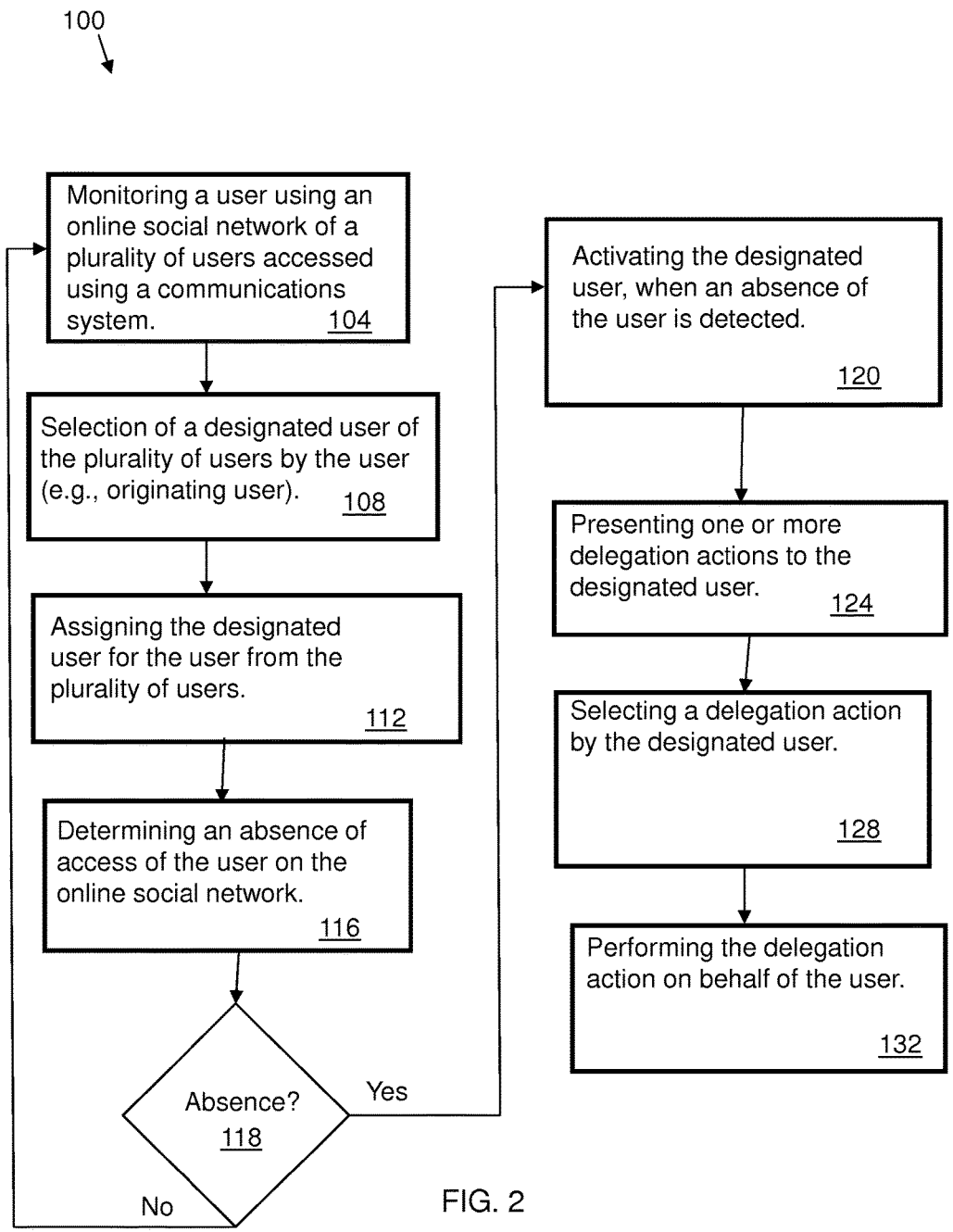
FIG. 2 is a flow chart illustrating a method for delegating authority on an online account based on FIG. 1 according to an embodiment of the disclosure.
Figure 3:
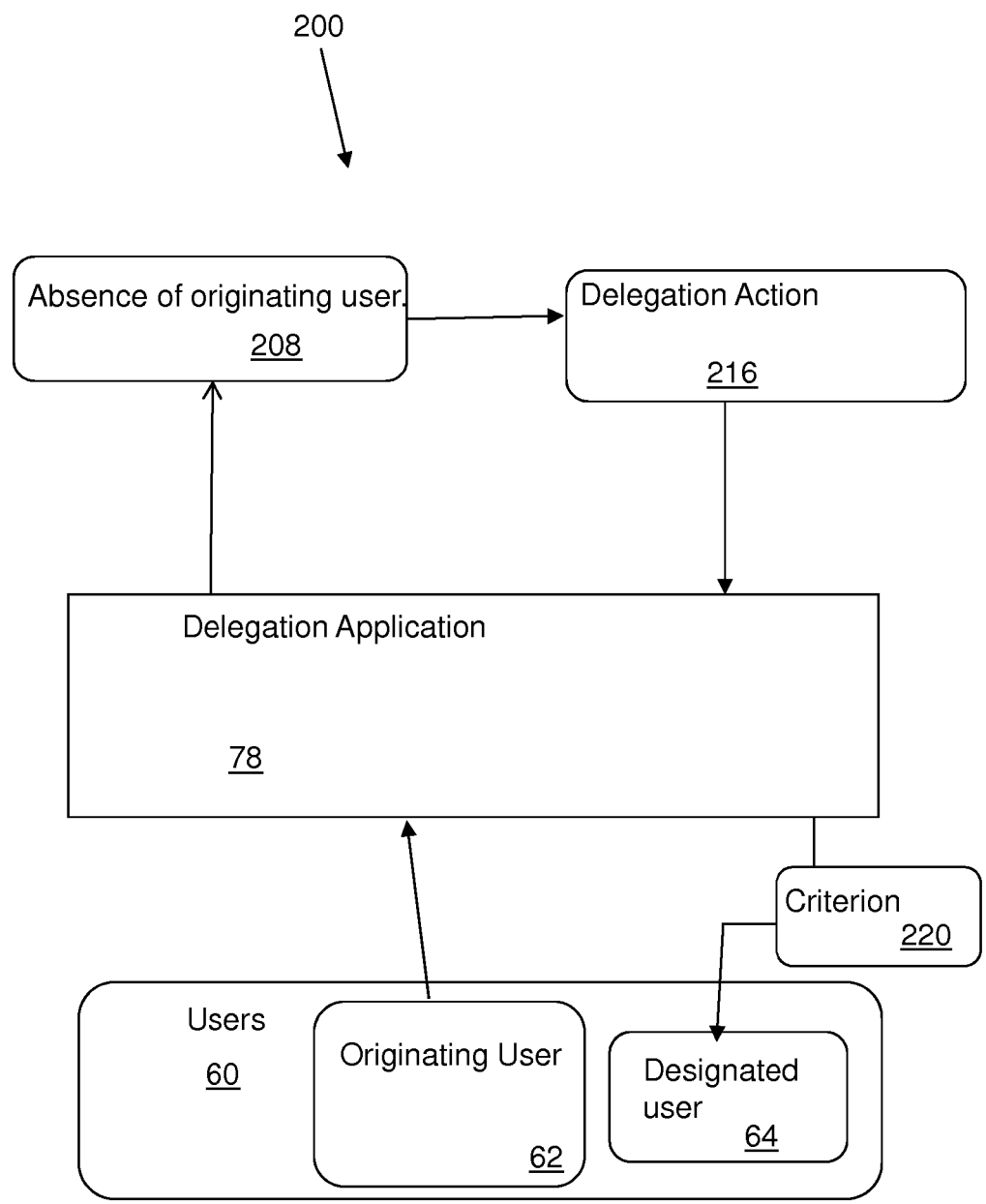
FIG. 3 is a schematic block diagram illustrating a method and system for delegating authority of an online account based on FIGS. 1 and 2, according to an embodiment of the disclosure.

Referring to FIGS. 1, 2 and 3 a system 10 and method 100 according to an embodiment of the present disclosure for delegating authority on an online account. The method 100 includes monitoring a user of a plurality of users using an online social network 84 on a communications system, as in block 104. Users 60 are shown in FIG. 1 using a representative device 70, which is envisioned as exemplary of each of the users. The device 70 includes a computer system 20. The device 70 can be a mobile device, or other types of computer devices. The device 70 includes a social networking software application 74 (also referred to as a social networking application), or can access a social network using a web browser (not shown) for accessing the Internet and accessing websites on the World Wide Web. A delegation application 78 is included on the device 70, which can be a separate application as shown in FIG. 1, and alternatively can be part (or integral with) the social networking application.

The users 60 can access the social network 84 using the device 70 via a communication system embodied as communications network 80, which can include, for example, the Internet, a telephone system, or a local area network.

Referring to FIG. 3, a functional diagram 200 with respect to the system 10 and method 100 (shown in FIGS. 1 and 2) includes an originating user 62 (as an embodiment of a user from the plurality of users 60 accessing the social network). The originating user selects a designated user 64 from the plurality of users 60, as in block 108. Responsive to the originating user 62 of the plurality of users 60 selection of the designated user 64, the method 100 assigns the designated user 64 for the originating user, as in block 112. For example, the designated user may be a work colleague, a friend, relative, or supervisor in a working relationship.

The method 100 can be implemented using the delegation application 78 shown in FIG. 1. The method can also be provided as a service which can be remote, for instance, including an application residing on a remote server exemplified by remote server 90.

The method determines an absence of access of the originating user 208 on the online social network, as in block 116. For example, an absence 208 can be determined by a lack of logging in by the originating user for a period of time. Alternatively, a user can be determined as absent if no activity has been logged within a time threshold. In one embodiment, an absence of access of the originating user can be determined by an absence of communication of the originating user which can include an absence of logging into the online social network. Another indication of absence of access of the originating user can be an absence of a device connection to the online social network. A lack of connection can be determined to indicate an absence of access when it occurs during a specified time frame, or exceeds a specified threshold time duration. Also, a lack of posts by an originating user, or alternatively a quantity of posts that do not meet a threshold, can indicate an absence of access.

The method 100 includes activating the designated user 64, as in block 120, when an absence of the originating user is detected, as in block 118. Thus, responsive to determining an absence of access, the method activates the designated user, as in block 120. When no absence of the originating user is detected in block 118, the method returns to block 104.

A delegation action 216 (FIG. 3) is presented to the designated user 64, as in block 124. The designated user selects a delegation action, as in block 128. The delegation action can be one action or a group a delegation actions for the designated user to select from. In one embodiment, the designated user can select one or more delegation actions. The delegation action can include, for example, approving of a post; sending a message; sending a message of unavailability of the originating user; or other tasks on behalf of the originating user.

The method 100 includes performing the delegation action 216 on behalf of the originating user 62, as in block 132, responsive to the designated user's selection of the delegation action. In one embodiment, one or more delegation actions can be presented to the designated user, or a group of delegation actions can be presented.

In one embodiment, the method can include a set of designated users which can be assigned from the plurality of users responsive to the originating user's selection of a set of designated users. The selection of one of the designated users from the set of designated users can be determined based on a criterion 220 (FIG. 3), responsive to determining the absence of access of the originating user on the online social network. The criterion can be one of, or be included in criteria comprising, for example, the most active user in the social network of the set of designated users; a designated user with the same title as the originating user in a work environment; or a designated user who is currently online at the time of the detected absence. A trusted user can also meet criteria or can also be designated, for example, a manager, or a person in an equivalent role in an organization.

In another embodiment, a set of delegation actions can be presented to the designated user in response to determining the absence of an originating user. The designated user can select a delegation action from the set of delegation actions. The selected delegation action can be initiated once selected by the designated user.

In another embodiment, one or more delegation rules can be specified for selecting a designated user. The delegation rules can be based on context of a social group and the originating user. A delegation rule can be selected from a group of rules. For example, a delegation rule can include: recent participant of a conversation; a list of designated users; a manager in a management chain of the originating user; or a work group member. For example, in an organizational environment, a delegation rule can be selected that selects a manager in a management chain.

The present disclosure enables a designated user to act on behalf of a user so that the originating user appears active, for instance, by posting for the originating user, or triggering a post for the originating user. The designated user can also inform other users of the status or an activity of the originating user while the originating user is unable to post.

Once the originating user is able to post/access their account, for example, by logging in, the designated user can be notified of the originating user's return. The designated user can also be blocked from posting for the originating user.

Thereby, the present disclosure enables an unavailable user to efficiently delegate updates, determining when a user is unavailable, selecting a second user, which can be from a set of preferred users, and identifying an update for the first user, and posting the update for the user. The update may be selected from a template or using free form.

The present disclosure can include prompting the designated user to post on the originating user's behalf. The designated user's post can be free form, or can be selected from a set of preconfigured and preapproved updates.

In one example according to an embodiment of the disclosure, multiple users are part of an online social network. An originating user has assigned a designated user. The originating user posts to the online social network, but then experiences a computer outage and is offline. The designated user is notified after the originating user is detected as offline or detected as absent. The method and system of the present disclosure includes preconfigured updates. The designated user is identified, and notified of the originating user's absence, and prompted with the preconfigured updates. The originating user is able to access the online social network again, logs back in, and can see the post(s) on their behalf, and now can continue to post.

In one example according to the present disclosure, a user's unavailability can be determined by monitoring and accessing posting patterns. In one example, if access by a user drops below a standard deviation based on previous posting patterns, the method and system can assume the user is unavailable.

The method can use a last login time if a user is not logged in within a set time frame (and further during normal business hours), the method can assume the user is unavailable. When a user's availability falls below a threshold, the method can activate a designated user to post on behalf of the unavailable user.

In another example according to an embodiment, the method and system can indicate any post by a designated user with a designation, such as, "on behalf of" the originating user. Alternatively, an indication of a post by a designated user can be used, such as a color, or typeset, typeface, or font, which designates the post as being from a designated user.

The device 70 may be a mobile device. A mobile device is one embodiment of a device having a computer or computer system 20, which is depicted generically in FIG. 1. Other devices having a computer or described as a computer or computer system may include, for example, a Personal Data Assistant (PDA), a cell phone, or a notebook, a desktop computer, or the like. The device in the present disclosure can be configured to send and receive electronic communications. The computer system 20 is a generic representation of a computer which may be embodied in a device such as a hand held device, or can also represent a server for providing the method of the present disclosure as a service which can be accessible using the Internet or a network.

In one embodiment according to the present disclosure, the method 100 may be embodied in a program 22 (FIG. 1) embodied on a computer readable storage device, e.g., data storage device 24. The program 22 is executable by a processor 28 of a computer system 20 (to execute program steps, code, or program code). Additional data storage may also be embodied as a database 40 including data 44. The program or executable instructions may be offered as a service by a provider. The computer 20 and program 22 shown in FIG. 1 are generic representations of a computer and program that may be local to a user, or provided as a remote service, such as website accessible using a network (e.g., interacting with the Internet or cloud services). It is understood that the computer 20 also generically represents herein a computer device or a computer included in a device, such as a laptop or desktop computer, etc., or one or more servers, alone or as part of a datacenter. The computer system 20 can include a network interface 32, and input/output (I/O) interface(s) 34. The I/O interface 34 allows for input and output of data with an external device 36 that may be connected to the computer system. The network interface 32 may provide communications between the computer system and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program. The method of the present disclosure can be run locally on a device such as the mobile device, or can be run a service, for instance, on a remote server 90 which is accessed using the communications network 80.

It is understood that a computer or a program running on the computer may communicate with a server computer via a communications network. The communications network may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

Referring to FIG. 1, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A computer implemented method for delegating authority on an online account, comprising:
   monitoring a user using a computer, the user being part of an online social network accessed using a communications system, the online social network including a plurality of users;
   assigning a designated user for the user from the plurality of users, responsive to the user's selection of the designated user;
   activating the designated user, responsive to determining an absence of access of the user on the online social network, and when the designated user is currently online at the time of the detected absence of access of the user;
   presenting a delegation action to the designated user;
   performing the delegation action on behalf of the user, responsive to the designated user's selection of the delegation action;
   detecting an absence of a device connection to the online social network, the absence of the device connection indicating the absence of access of the user, the absence of the device connection occurring during a specified time frame or exceeding a specified threshold time duration;
   assigning a set of designated users from the plurality of users responsive to the user of the plurality of users selection of the set of designated users; and
   selecting one of the designated users from the set of designated users based on a criterion, responsive to determining the absence of access of the user on the online social network, wherein the absence of access is indicated by a lack of posts by an originating user, or alternatively a quantity of posts that do not meet a threshold.

2. The method of claim 1, further comprising:
   utilizing a delegation rule for selecting the designated user.

3. The method of claim 2, wherein the delegation rule is selected from a group of rules comprising: recent participant of a conversation; a list of designated users; a manager in a management chain of the user; and a work group member.

4. The method of claim 1, further comprising:
   presenting to the designated user a set of delegation actions; and
   initiating a selected delegation action from the set of delegation actions responsive to the designated user's selection of the selected delegation action.

5. The method of claim 1, further comprising:
   detecting an absence of communication of the user on the online social network, the absence of communication indicating the absence of access of the user, the absence of communication includes a lack of logging into the online social network.

6. A computer system for delegating authority on an online account, the computer system comprising:
   one or more computer processors, one or more computer-readable storage media, and program instructions stored on one or more of the computer-readable storage media for execution by at least one of the one or more processors, the program instructions, comprising:

monitoring a user using a computer, the user being part of an online social network accessed using a communications system, the online social network including a plurality of users;

assigning a designated user for the user from the plurality of users, responsive to the user's selection of the designated user;

activating the designated user, responsive to determining an absence of access of the user on the online social network, and when the designated user is currently online at the time of the detected absence of access of the user;

presenting a delegation action to the designated user;

performing the delegation action on behalf of the user, responsive to the designated user's selection of the delegation action;

detecting an absence of a device connection to the online social network, the absence of the device connection indicating the absence of access of the user, the absence of the device connection occurring during a specified time frame or exceeding a specified threshold time duration;

assigning a set of designated users from the plurality of users responsive to the user of the plurality of users selection of the set of designated users; and selecting one of the designated users from the set of designated users based on a criterion, responsive to determining the absence of access of the user on the online social network, wherein the absence of access is indicated by a lack of posts by an originating user, or alternatively a quantity of posts that do not meet a threshold.

7. The system of claim 6, further comprising:

presenting to the designated user a set of delegation actions; and initiating a selected delegation action from the set of delegation actions responsive to the designated user's selection of the selected delegation action.

8. The system of claim 6, further comprising:

detecting an absence of communication of the user on the online social network, the absence of communication indicating the absence of access of the user, the absence of communication includes a lack of logging into the online social network.

9. The system of claim 6, further comprising:

utilizing a delegation rule for selecting the designated user.

10. A computer program product for delegating authority on an online account, the computer program product comprising a computer readable storage medium having program instructions embodied therewith, wherein the computer readable storage medium is not a transitory signal per se, the program instructions executable by a computer to cause the computer to perform a method, comprising:

monitoring a user using a computer, the user being part of an online social network accessed using a communications system, the online social network including a plurality of users;

assigning a designated user for the user from the plurality of users, responsive to the user's selection of the designated user;

activating the designated user, responsive to determining an absence of access of the user on the online social network, and when the designated user is currently online at the time of the detected absence of access of the user;

presenting a delegation action to the designated user;

performing the delegation action on behalf of the user, responsive to the designated user's selection of the delegation action;

detecting an absence of a device connection to the online social network, the absence of the device connection indicating the absence of access of the user, the absence of the device connection occurring during a specified time frame or exceeding a specified threshold time duration;

assigning a set of designated users from the plurality of users responsive to the user of the plurality of users selection of the set of designated users; and selecting one of the designated users from the set of designated users based on a criterion, responsive to determining the absence of access of the user on the online social network, wherein the absence of access is indicated by a lack of posts by an originating user, or alternatively a quantity of posts that do not meet a threshold.

11. The computer program product of claim 10, further comprising:

presenting a set of delegation actions to the designated user; and initiating a selected delegation action from the set of delegation actions responsive to the designated user's selection of the selected delegation action.

12. The computer program product of claim 10, further comprising:

detecting an absence of communication of the user on the online social network, the absence of communication indicating the absence of access of the user, the absence of communication includes a lack of logging into the online social network.

13. The computer program product of claim 10, further comprising:

utilizing a delegation rule for selecting the designated user.

14. The computer program product of claim 13, wherein the delegation rule is selected from a group of rules comprising: recent participant of a conversation; a list of designated users; a manager in a management chain of the user; and a work group member.

* * * * *